US011159115B2

United States Patent
Arisawa et al.

(10) Patent No.: US 11,159,115 B2
(45) Date of Patent: Oct. 26, 2021

(54) MOTOR DRIVING DEVICE AND REFRIGERATING AIR-CONDITIONING DEVICE (71) Applicant: Mitsubishi Electric Corporation, Tokyo (JP)

(72) Inventors: Koichi Arisawa, Tokyo (JP); Kazunori Hatakeyama, Tokyo (JP); Keisuke Uemura, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/747,851

(22) PCT Filed: Aug. 12, 2015

(86) PCT No.: PCT/JP2015/072834
§ 371 (c)(1),
(2) Date: Jan. 26, 2018

(87) PCT Pub. No.: WO2017/026061
PCT Pub. Date: Feb. 16, 2017

(65) Prior Publication Data
US 2018/0219508 A1 Aug. 2, 2018

(51) Int. Cl.
*H02P 27/08* (2006.01)
*F25B 49/02* (2006.01)
(Continued)

(52) U.S. Cl.
CPC .......... *H02P 27/08* (2013.01); *B60H 1/3222* (2013.01); *F25B 49/025* (2013.01);
(Continued)

(58) Field of Classification Search
USPC ....................................... 318/811
See application file for complete search history.

(56) References Cited

U.S. PATENT DOCUMENTS 4,716,347 A * 12/1987 Fujimoto .......... H02M 7/53873
318/432
4,879,502 A * 11/1989 Endo .................. H02P 6/085
318/723
(Continued)

FOREIGN PATENT DOCUMENTS

JP 59021284 A * 2/1984 .............. H02M 7/48
JP 2001041168 A * 2/2001
(Continued)

OTHER PUBLICATIONS

International Search Report of the International Searching Authority dated Nov. 2, 2015 for the corresponding international application No. PCT/JP2015/072834 (and English translation).
(Continued)

*Primary Examiner* — Jorge L Carrasquillo
(74) *Attorney, Agent, or Firm* — Posz Law Group, PLC (57) ABSTRACT

A motor driving device that drives a motor with an alternating-current power converted from a direct-current power supply, includes an inverter that receives a pulse-width modulation signal and supplies the alternating-current power to the motor, and an inverter control unit that generates the pulse-width modulation signal and supplies the pulse-width modulation signal to the inverter. The inverter control unit reduces the number of pulses of the pulse-width modulation signal generated during a first period within one period of a mechanical angle of the motor to be lower than the number of pulses of the pulse-width modulation signal generated during a second period within the one period of the mechanical angle of the motor. The first period is a period during which a load torque is lower than a load torque during the second period.

12 Claims, 9 Drawing Sheets

(51) Int. Cl.
*H02P 21/22* (2016.01)
*H02M 7/5395* (2006.01)
*H02P 21/18* (2016.01)
*B60H 1/32* (2006.01)
*H02M 7/217* (2006.01)

(52) U.S. Cl.
CPC .......... *H02M 7/5395* (2013.01); *H02P 21/18* (2016.02); *H02P 21/22* (2016.02); *H02P 27/085* (2013.01); *F25B 2600/021* (2013.01); *H02M 7/217* (2013.01)

(56) References Cited

U.S. PATENT DOCUMENTS

| | | | |
|---|---|---|---|
| 4,992,715 A * | 2/1991 | Nakamura | G05D 17/02 318/432 |
| 7,911,177 B2 | 3/2011 | Ohtani et al. | |
| 8,498,136 B2 | 7/2013 | Shinomoto et al. | |
| 9,276,508 B2 | 3/2016 | Nakazumi et al. | |
| 2010/0052583 A1 * | 3/2010 | Takamatsu | H02P 27/08 318/400.09 |
| 2010/0134053 A1 * | 6/2010 | Yamada | H02M 7/53875 318/162 |
| 2011/0019452 A1 * | 1/2011 | Shinomoto | H02M 7/217 363/126 |
| 2012/0056569 A1 * | 3/2012 | Takamatsu | B60L 15/08 318/400.26 |
| 2014/0354191 A1 | 12/2014 | Nakazumi et al. | |
| 2015/0077025 A1 * | 3/2015 | Suzuki | H02P 21/05 318/400.02 |

FOREIGN PATENT DOCUMENTS

| | | |
|---|---|---|
| JP | 2008-312420 A | 12/2008 |
| JP | 2009-278827 A | 11/2009 |
| JP | 2010-051129 A | 3/2010 |
| JP | 5075892 B2 | 8/2012 |
| JP | 2015-122858 A | 7/2015 |
| KR | 10-2014-0141484 A | 12/2014 |
| WO | 2009/028053 A1 | 3/2009 |
| WO | 2019/016901 A1 | 1/2019 |

OTHER PUBLICATIONS

Office Action dated Jul. 17, 2018 issued in corresponding JP patent application No. 2017-534080 (and English translation).
Korean Office Action dated Jan. 22, 2019 for the corresponding Korean application No. 10-2018-7002926 (English translation attached).
Office Action dated Jul. 31, 2019 issued in corresponding KR patent application No. 10-2018-7002926 (and English machine translation).
Office Action dated Jan. 19, 2020 issued in corresponding CN patent application No. 201580082276.1 (and English machine translation).

\* cited by examiner

MOTOR DRIVING DEVICE AND REFRIGERATING AIR-CONDITIONING DEVICE

CROSS REFERENCE TO RELATED APPLICATION

This application is a U.S. national stage application of International Patent Application No. PCT/JP2015/072834 filed on Aug. 12, 2015, the disclosure of which is incorporated herein by reference.

TECHNICAL FIELD

The present invention relates to a motor driving device that drives a motor by an alternating-current power converted from a direct-current power, and to a refrigerating air-conditioning device.

BACKGROUND

PWM (Pulse Width Modulation) is often used as a method of generating a driving signal of a switching element of an inverter. PWM is a modulation method that can output a voltage, which can be instantaneously output by the switching element, as an average voltage in a switching period by controlling a ratio of an ON time and an OFF time with respect to the switching period. PWM is roughly classified into asynchronous PWM and synchronous PWM. The method of generating the switching element driving signal by the PWM employs, in many cases, a carrier-wave comparison scheme that compares the magnitudes of the output-voltage command value with the carrier wave.

The synchronous PWM controls the carrier frequency to be the integer multiple of the frequency of the output-voltage command value while the asynchronous PWM keeps the carrier frequency constant regardless of the frequency of the output-voltage command value. An inverter device described in Patent Literature 1 employs the synchronous PWM scheme, and Patent Literature 1 suggests a method of controlling an amount of change in a PWM frequency in accordance with an acceleration of a motor or noise.

PATENT LITERATURE

Patent Literature 1: Japanese Patent No. 5075892

For a compressor of an air-conditioning device that is a load for a conventional inverter device represented by Patent Literature 1, a load torque periodically changes due to an operation cycle of the compressor. For the conventional inverter device, the carrier frequency is controlled to be the integer multiple of the frequency of the output-voltage command value in driving such a load with the periodically changing load torque. Patent Literature 1 does not specifically disclose that the carrier frequency is changed in accordance with the periodical change of the load torque to control the output voltage of the inverter such that further reduction in loss of the inverter is achieved.

SUMMARY

The present invention has been achieved in view of the above problems, and an object of the present invention is to provide a motor driving device that can achieve the further reduction in the loss of the inverter.

In order to solve the above problems and achieve the object, a motor driving device according to the present invention drives a motor with an alternating-current power converted from a direct-current power, the motor driving device comprising an inverter that receives a pulse-width modulation signal and supplies the alternating-current power to the motor and an inverter control unit that generates the pulse-width modulation signal and supplies the pulse-width modulation signal to the inverter, wherein the inverter control unit reduces number of pulses of the pulse-width modulation signal generated during a first period within one period of a mechanical angle of the motor to be lower than number of pulses of the pulse-width modulation signal generated during a second period within the one period of a mechanical angle of the motor, and the first period is a period during which a load torque is lower than a load torque during the second period.

The motor driving device according to the present invention has an effect of further reducing the loss of the inverter.

DETAILED DESCRIPTION

A motor driving device and a refrigerating air-conditioning device according to an embodiment of the present invention will be described below in detail with reference to the accompanying drawings. The present invention is not limited to the embodiment.

Embodiment

Figure 1:
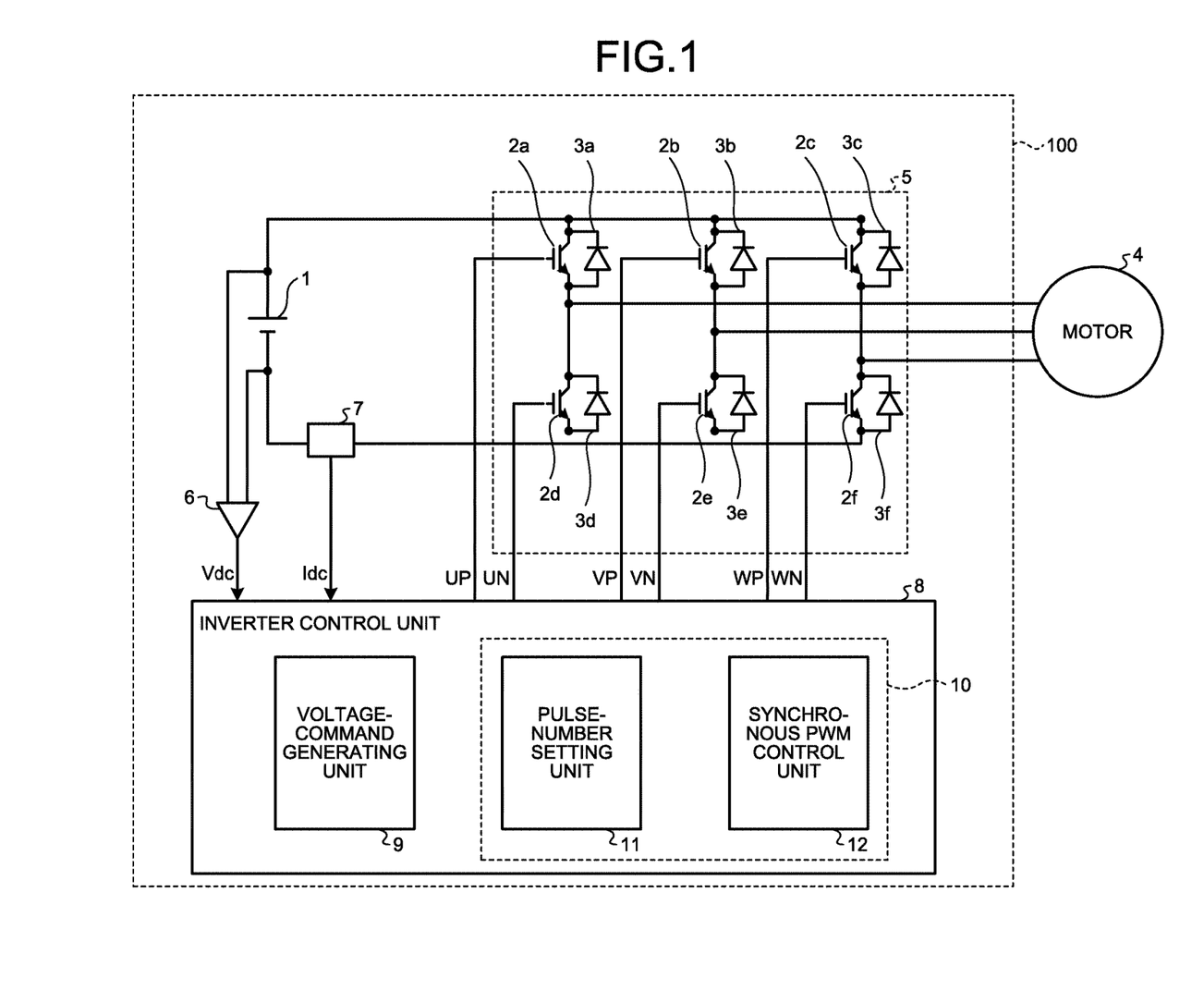
FIG. 1 is a diagram illustrating a configuration of a motor driving device according to an embodiment of the present invention.

FIG. 1 is a diagram illustrating a configuration of a motor driving device according to an embodiment of the present invention. A motor driving device 100 includes an inverter 5 that outputs an alternating-current power to a motor 4 for driving a load (not illustrated), a voltage detecting unit 6 that detects a voltage value of a direct-current voltage applied to the input side of the inverter 5, and a current detecting unit 7 that detects a current value of a direct current flowing to the inverter 5. The inverter 5 is defined by a plurality of semiconductor switching elements 2a to 2f and a plurality of diodes 3a to 3f connected one-to-one in parallel to the semiconductor switching elements 2a to 2f. The semiconductor switching elements convert a direct-current power supplied from a direct-current power supply 1 to the alternating-current power.

The motor driving device 100 further includes an inverter control unit 8. The inverter control unit 8 receives inputs of the voltage detected by the voltage detecting unit 6 and the current detected by the current detecting unit 7 to generate and then output pulse-width modulation (PWM) signals UP, VP, WP, UN, VN, and WN to the inverter 5, such that the inverter 5 performs a switching operation.

The inverter control unit 8 is configured such that the number of pulses of a pulse-width modulation signal generated during a first period within one period of a mechanical angle of the motor 4, that is, within one period of a mechanical angle of the load driven by the motor 4 is reduced to be smaller than the number of pulses of the pulse-width modulation signal generated during a second period within the one period of the mechanical angle of the motor 4. The first period is a period during which a load torque is lower than that in the second period. The period of the mechanical angle of the motor 4 is hereinafter read as one period of the mechanical angle of the load. The inverter control unit 8 includes a voltage-command generating unit 9 that generates a voltage command on the basis of a voltage Vdc detected by the voltage detecting unit 6 and a current Idc detected by the current detecting unit 7, and a pulse-number changing unit 10 that changes the number of pulses of the PWM signal once or more in one period of the mechanical angle of the load, on the basis of load information obtained from the current Idc.

The pulse-number changing unit 10 includes a pulse-number setting unit 11 that sets the number of pulses corresponding to the load. The pulse-number changing unit 10 further includes a synchronous PWM control unit 12 that outputs the PWM signals to drive the semiconductor switching elements 2a to 2f. The pulse-number changing unit 10 changes the number of pulses of the PWM signal once or more in one period of the mechanical angle of the load, or changes the number of pulses of the PWM signal in one period of an electric angle of the voltage command generated by the voltage-command generating unit 9, or changes the number of pulses of the PWM signal when the frequency of the voltage command generated by the voltage-command generating unit 9 is a certain value or less, or changes the number of pulses of the PWM signal when an average value of the load torque in one period of the mechanical angle of the load is a certain value or less.

The direct-current power supply 1 described in the present embodiment may be a direct-current power supply obtained by rectifying and smoothing an alternating-current power supply with a diode bridge. Alternatively, the direct-current power supply may be a direct-current power supply represented by a solar cell or a battery. The semiconductor switching elements 2a to 2f of the inverter 5 can be any of the following: a transistor, an IGBT (Insulated Gate Bipolar Transistor), a MOS-FET (Metal Oxide Semiconductor-Field Effect Transistor), a thyristor, or a GTO (Gate Turn-Off Thyristor).

In addition, a semiconductor material for the semiconductor switching elements 2a to 2f may be not only silicon (Si), which is a mainly used material, but also any of semiconductor materials, generally called wide bandgap semiconductor, that include silicon carbide (SiC), gallium nitride (GaN), or diamond (carbon: C). Although a falling zero-cross point of a voltage command Vu* is used as a reference point of a voltage phase θv, for example, 0 radian in the present embodiment, the reference point of the voltage phase θv may be a position other than the falling zero-cross point of the voltage command Vu*. For example, a falling zero-cross point of a voltage command Vv* or a falling zero-cross point of a voltage command Vw* may be used as the reference point of the voltage phase θv.

The configuration of the inverter control unit 8 is described below in detail.

Figure 2:
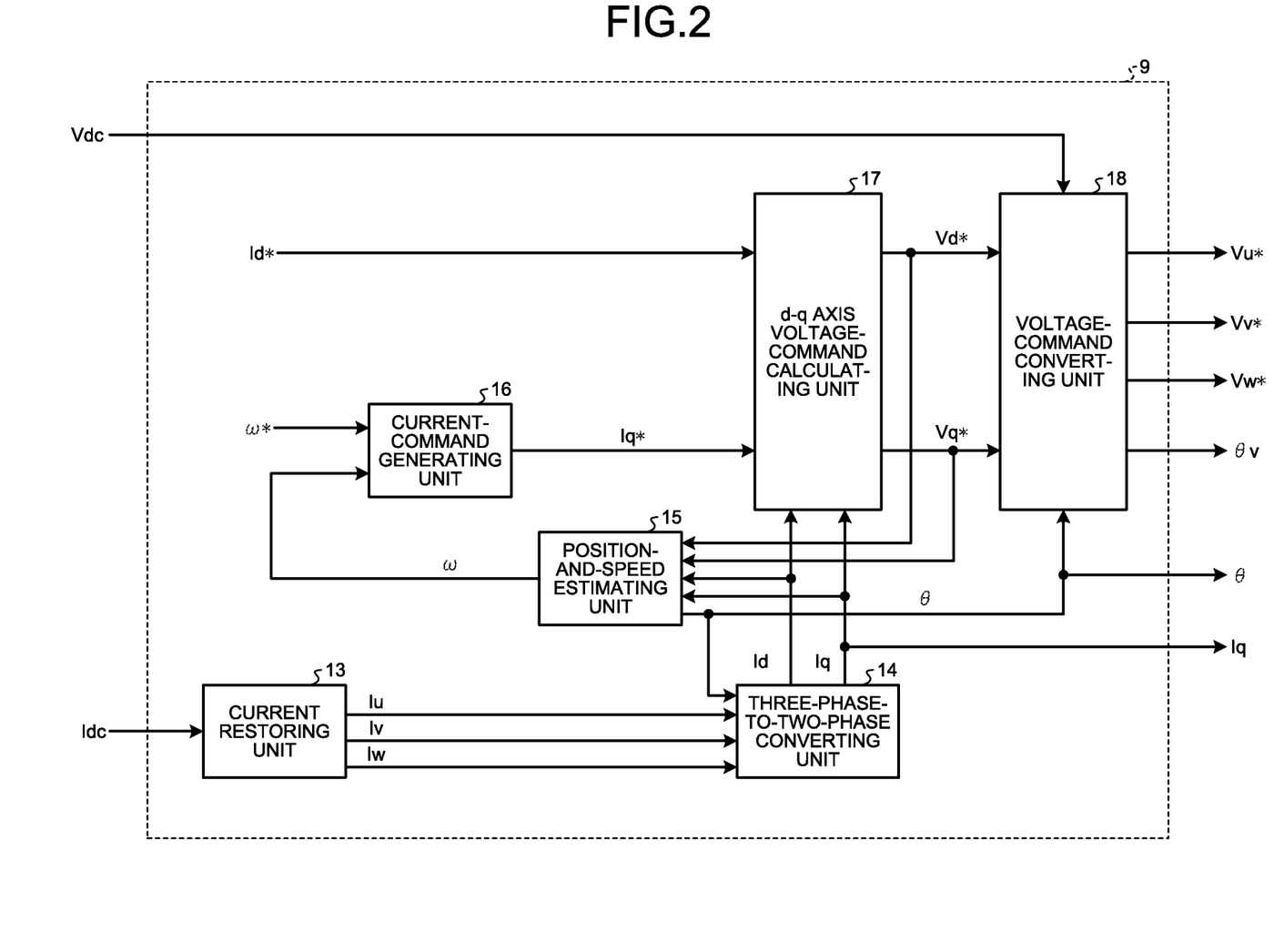
FIG. 2 is a configuration diagram of a voltage-command generating unit of the motor driving device according to the embodiment of the present invention.

FIG. 2 is a configuration diagram of a voltage-command generating unit of the motor driving device according to the embodiment of the present invention. The voltage-command generating unit 9 includes a current restoring unit 13 that restores motor phase currents Iu, Iv, and Iw flowing to the motor 4 from the current Idc detected by the current detecting unit 7. The voltage-command generating unit 9 also includes a three-phase-to-two-phase converting unit 14 that is a coordinate converting unit converting the motor phase currents Iu, Iv, and Iw restored by the current restoring unit 13, into a d-axis current Id and a q-axis current Iq on the d-q coordinate axes on the basis of the position θ of a rotor magnetic pole of the motor 4. The voltage-command generating unit 9 further includes a position-and-speed estimating unit 15 that estimates the rotor magnetic pole position θ and a speed estimated value ω on the basis of the d-axis current Id and the q-axis current Iq provided by the three-phase-to-two-phase converting unit 14 and the voltage commands Vd* and Vq*.

Furthermore, the voltage-command generating unit 9 includes a current-command generating unit 16 and a d-q axis voltage-command calculating unit 17. The current-command generating unit 16 generates a q-axis current command Iq* that is a command value of a q-axis current on the d-q coordinates, at which command value the speed estimated value ω estimated by the position-and-speed estimating unit 15 matches a speed command value ω. The d-q axis voltage-command calculating unit 17 obtains a d-axis voltage command Vd* at which the d-axis current Id provided by the three-phase-to-two-phase converting unit 14 matches a d-axis current command Id* that is a command value of the d-axis current on the d-q coordinates generated by a current-command generating unit (not illustrated). The d-q axis voltage-command calculating unit 17 further obtains a q-axis voltage command Vq* at which the q-axis current Iq matches the q-axis current command Iq* generated by the current-command generating unit 16.

The voltage-command generating unit 9 further includes a voltage-command converting unit 18 that converts the d-axis voltage command Vd* and the q-axis voltage command Vq* calculated by the d-q axis voltage-command calculating unit 17, into voltage commands Vu*, Vv*, and Vw* for a U-phase, a V-phase, and a W-phase on the basis of the voltage Vdc detected by the voltage detecting unit 6 and the rotor magnetic pole position θ estimated by the position-and-speed estimating unit 15.

In addition to converting the d-axis voltage command Vd* and the q-axis voltage command Vq* into the voltage commands Vu*, Vv*, and Vw*, the voltage-command converting unit 18 outputs the voltage phase θv having a reference point defined by a falling zero-cross point of the voltage command Vu*.

Since each element of the voltage-command generating unit 9 is well-known in the art, detailed explanations thereof are omitted. As far as the voltage-command generating unit 9 can drive the motor 4, the configuration thereof is not limited to the configuration exemplified in the drawings.

Figure 3:
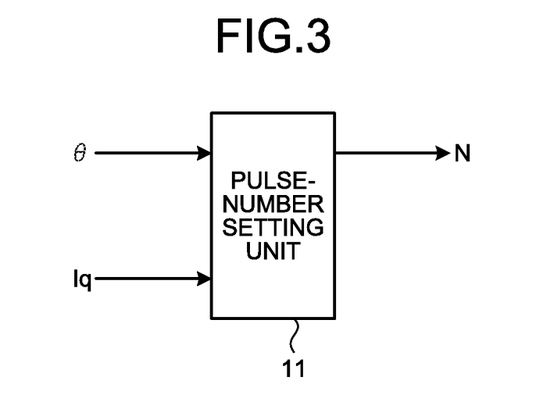
FIG. 3 is a configuration diagram of a pulse-number setting unit of the motor driving device according to the embodiment of the present invention.

FIG. 3 is a configuration diagram of a pulse-number setting unit of the motor driving device according to the embodiment of the present invention. The pulse-number setting unit 11 estimates a value of a load torque corresponding to one period of a mechanical angle of a load from the rotor magnetic pole position θ estimated by the position-and-speed estimating unit 15 and the q-axis current Iq provided by the three-phase-to-two-phase converting unit 14, and outputs the number of pulses N corresponding to the estimated value of the load torque. The number of pulses N is a value for determining a frequency of a carrier wave used for synchronous PWM control.

Figure 4:
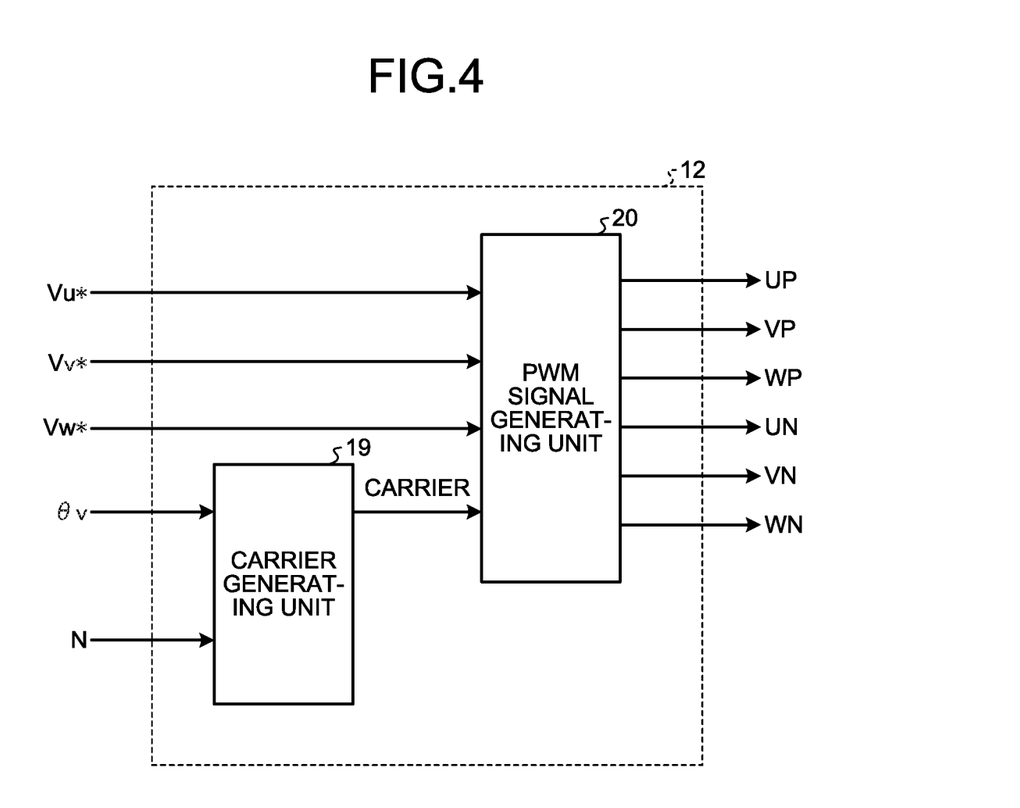
FIG. 4 is a configuration diagram of a synchronous PWM control unit of the motor driving device according to the embodiment of the present invention.

FIG. 4 is a configuration diagram of a synchronous PWM control unit of the motor driving device according to the embodiment of the present invention. The synchronous PWM control unit 12 includes a carrier generating unit 19 and a PWM signal generating unit 20. The carrier generating unit 19 generates a carrier wave having a frequency corresponding to the number of pulses N set by the pulse-number setting unit 11 in FIG. 3, in such a manner as to bring the carrier wave into synchronization with the voltage phase θv output from the voltage-command converting unit 18 in FIG. 2. The PWM signal generating unit 20 compares the voltage commands Vu*, Vv*, and Vw* provided by the voltage-command converting unit 18 in FIG. 2 with the carrier wave generated by the carrier generating unit 19, thereby generating the PWM signals UP, VP, WP, UN, VN, and WN.

Next, a load of the motor 4 and an operation of the motor driving device 100 are described in association with each other.

Figure 5A:
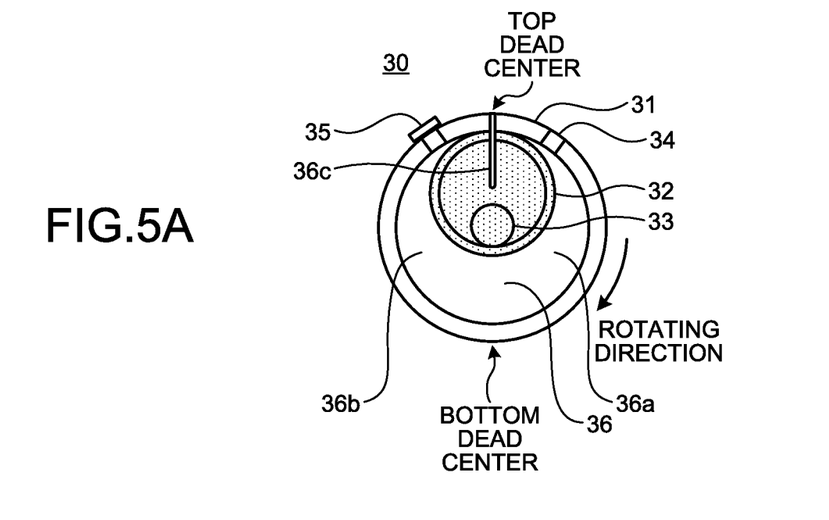
FIG. 5A is a horizontal cross-sectional view of a hermetic compressor that is a load of a motor driven by the motor driving device according to the embodiment of the present invention.
Figure 5B:
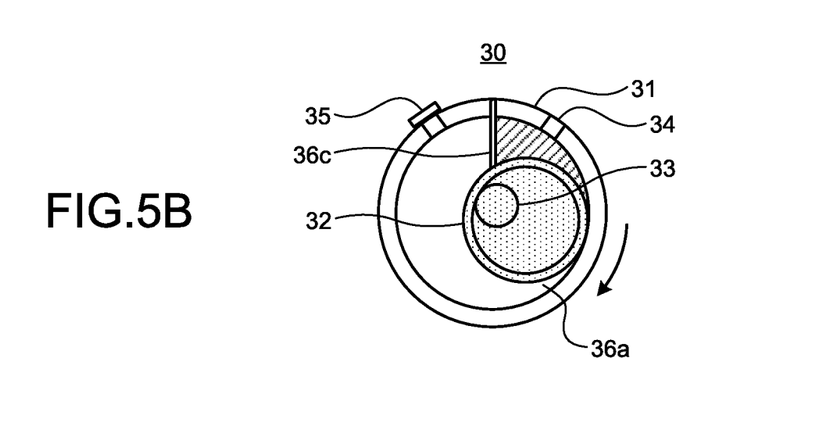
FIG. 5B is a horizontal cross-sectional view of the hermetic compressor that is the load of the motor driven by the motor driving device according to the embodiment of the present invention.
Figure 5C:
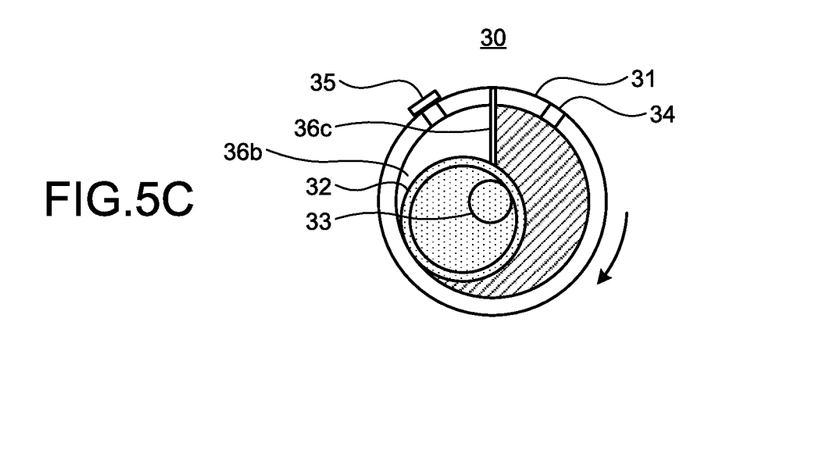
FIG. 5C is a horizontal cross-sectional view of the hermetic compressor that is the load of the motor driven by the motor driving device according to the embodiment of the present invention.

FIGS. 5A to 5C are horizontal cross-sectional views of a hermetic compressor that is the load of the motor driven by the motor driving device according to the embodiment of the present invention. The compressor 30 illustrated in FIGS. 5A to 5C includes a cylinder 31, a rolling piston 32 disposed inside the cylinder 31, and a rotation shaft 33 extending through the rolling piston 32. A suction port 34 and a discharge port 35 are formed in the cylinder 31. The rotation shaft 33 extends through a rotor of the motor 4 as well. One period of a mechanical angle of the rolling piston 32 is equal to one period of a mechanical angle of the rotor. A cylinder chamber 36 is defined by a low-pressure chamber 36a communicating with the suction port 34, a high-pressure chamber 36b communicating with the discharge port 35, and a vane 36c that separates the low-pressure chamber 36a and the high-pressure chamber 36b from each other.

An alternating-current power is suppled from the inverter 5 illustrated in FIG. 1 to the motor 4, so that the rotor of the motor 4 illustrated in FIG. 1 rotates and the rolling piston 32 disposed on the rotation shaft 33 of the rotor rotates within the cylinder 31. At this time, a refrigerant gas, which is sucked through a suction pipe (not illustrated), flows into the low-pressure chamber 36a from the suction port 34. The sucked refrigerant gas is compressed in the cylinder chamber 36 and is discharged out from the discharge port 35. FIG. 5A illustrates a state of the rolling piston 32 located near a top dead center. At this time, the refrigerant gas is sucked into the cylinder 31. FIG. 5B illustrates a state of the rolling piston 32 rotating clockwise to move toward a bottom dead center, compressing the refrigerant gas sucked into the cylinder 31 from the suction port 34.

At this time, the refrigerant gas in the cylinder 31 is compressed by the rolling piston 32. FIG. 5C illustrates a state of the rolling piston 32 after the rolling piston 32 has moved past the bottom dead center. At this time, the compressed refrigerant gas is discharged out from the discharge port 35.

In the hermetic compressor 30, the strokes including suction, compression, and discharge of the refrigerant are performed during one revolution of the rolling piston 32, that is, during one revolution of the rotor of the motor 4. For the compressor 30, thus, a pressure change, or a periodical change in a load torque depending on a mechanical angle of the rolling piston 32, that is, a periodical change of a load torque may occur due to the mechanical structure. When the rolling piston 32 is located near the top dead center, as illustrated in FIG. 5A, the load torque is light, or small. When the rolling piston 32 is located near the bottom dead center, as illustrated in FIGS. 5B and 5C, the load torque is heavy, or large. For the hermetic compressor 30 of the illustrated example, particularly, the change in the load torque tends to becomes larger as the number of revolutions of the rolling piston 32 becomes smaller.

Figure 6:
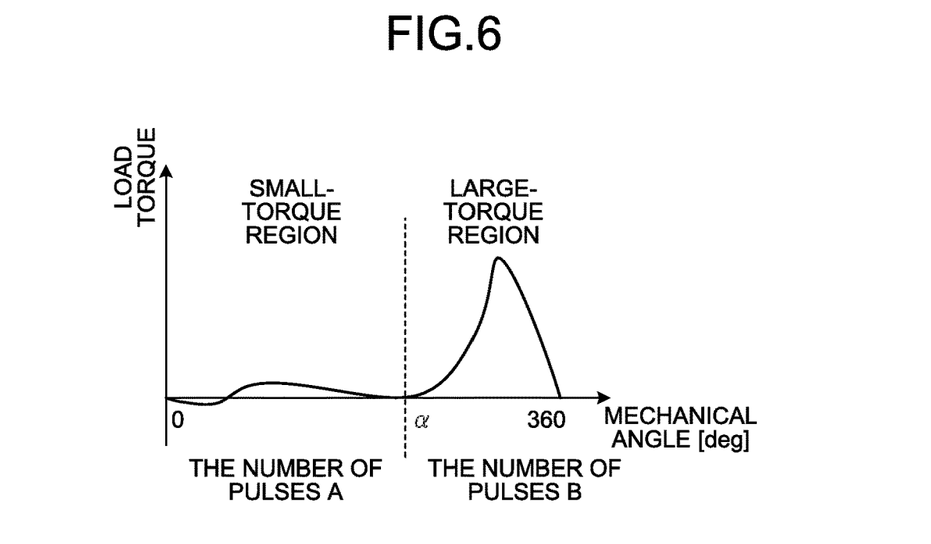
FIG. 6 is a diagram illustrating a change in a load torque during one revolution of a rolling piston illustrated in FIG. 5.

FIG. 6 is a diagram illustrating a change in a load torque during one revolution of the rolling piston illustrated in FIG. 5. The horizontal axis represents a mechanical angle of the rolling piston 32. The vertical axis represents the load torque. The load torque is small in a range of the mechanical angle from 0° to α°, and is large in a range of the mechanical angle from α° to 360°. The angle α° is an any angle between 200° and 240° in the mechanical angle, for example.

For the motor driving device 100, one period of the mechanical angle of the load has one region that is a small-torque region in the range of the mechanical angle from, for example, 0° to α° illustrated in FIG. 6, and the other region that is a large-torque region in the range of the mechanical angle from α° to 360°. In the small-torque region, the number of pulses of a PWM signal is a first value A (hereinafter referred to "the number of pulses A"). In the large-torque region, the number of pulses of the PWM signal is a second value B larger than the number of pulses A. The second value B is hereinafter referred to "the number of pulses B". Since the number of pulses A in the small-torque region is reduced, the number of times of switching of the semiconductor switching elements 2a to 2f illustrated in FIG. 1 is reduced in the range of the mechanical angle from 0° to α°, so that the inverter 5 can be driven with low loss.

In the range of the mechanical angle from α° to 360°, an output voltage of the inverter 5 is high, and "close" control is required in order to obtain an output torque corresponding to the load torque. For the motor driving device 100 according to the present embodiment, the semiconductor switching elements 2a to 2f can be controlled to perform switching operation an appropriate number of times in the range of the mechanical angle from α° to 360°. Since the number of pulses of the PWM signal is set to be an appropriate value corresponding to the mechanical angle, it is possible to perform synchronous PWM control efficiently without deteriorating controllability with respect to the motor 4.

Figure 7:
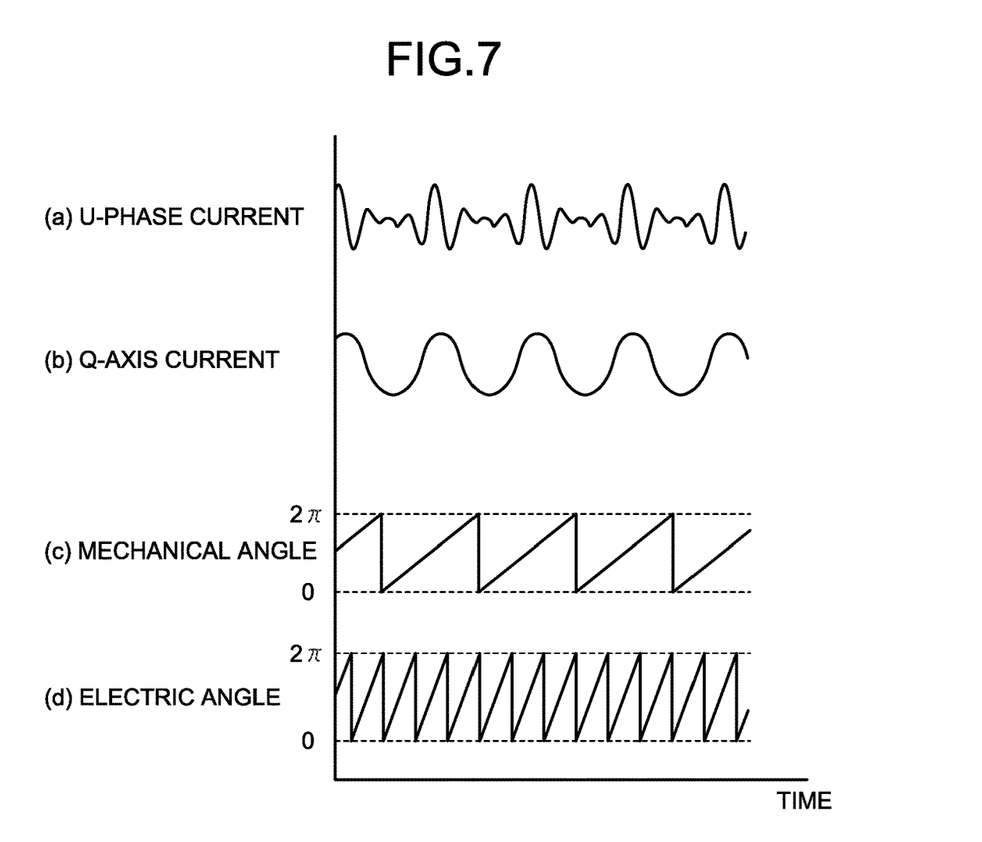
FIG. 7 is a diagram illustrating a relation among a U-phase current, a q-axis current, a mechanical angle of a compressor, and an electric angle of a motor when the compressor is driven by the motor driving device according to the embodiment of the present invention.

FIG. 7 is a diagram illustrating a relation among a U-phase current, a q-axis current, a mechanical angle of a compressor, and an electric angle of a motor when the compressor is driven by the motor driving device according to the embodiment of the present invention. FIG. 7(a) illustrates a waveform of a U-phase current output from the inverter illustrated in FIG. 1. FIG. 7(b) illustrates a waveform of the q-axis current Iq provided by the three-phase-to-two-phase converting unit 14 in FIG. 2. FIG. 7(c) illustrates a mechanical angle of the rolling piston 32 incorporated in the compressor 30 in FIG. 5. FIG. 7(d) illustrates an electric angle of the motor 4.

Assuming that a mechanical angle is 0 radian when the rolling piston 32 is located near the top dead center and the number of magnetic poles of the motor 4 is three, FIGS. 7(a) and (b) illustrate the waveforms of the U-phase current and the q-axis current Iq in which case the number of pulses is not changed in each of the two torque regions illustrated in FIG. 6.

The load torque and correlates with the mechanical angle, as described above. In view of a current being in proportion to a torque, typically, it is appropriate to drive the motor 4, setting a small current flowing to the motor 4 as the rolling piston is near the top dead center at which the load torque is small, and a large current flowing to the motor 4 as the rolling piston is near the bottom dead center at which the load torque is large. Since a value of the load torque is specified within one period of the mechanical angle of the rolling piston 32, the current should be large when the rolling piston 32 is located near the bottom dead center is large while the small current suffices when the rolling piston 32 is located near the top dead center.

When the rolling piston is near the top dead center at which the current flowing to the motor 4 is small, the output voltage is small. In general, thus, even the small number of times of switching of a PWM signal does affect the controllability. That is, the number of times of switching can be reduced as the rolling piston is near the top dead center.

Figure 8:
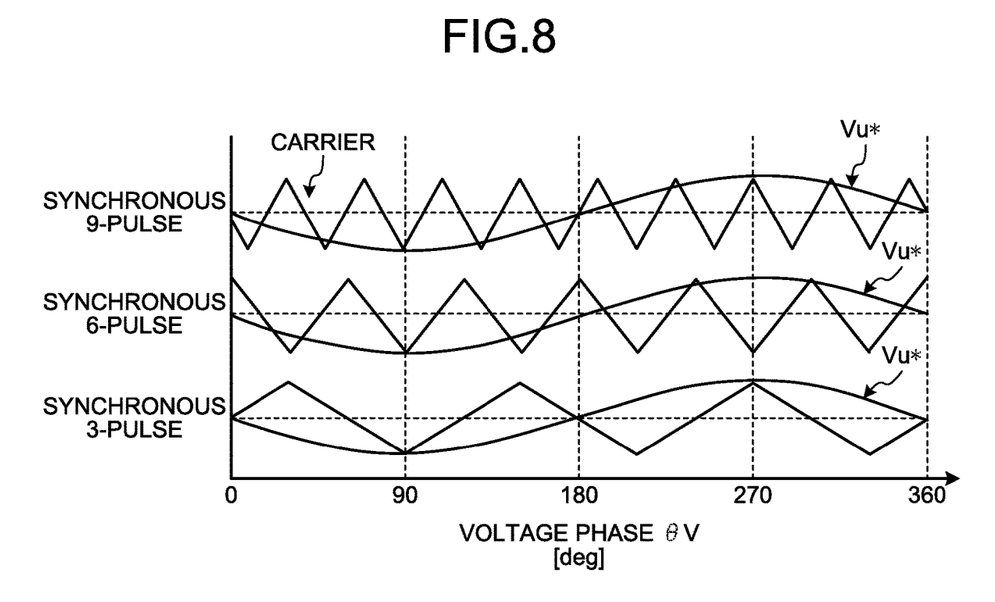
FIG. 8 is a diagram illustrating a carrier wave and a voltage command in a synchronous PWM scheme.

FIG. 8 is a diagram illustrating a carrier wave and a voltage command in a synchronous PWM scheme. The horizontal axis in FIG. 8 represents the voltage phase θv. FIG. 8 illustrates, in order from the top, the voltage command Vu* and the waveform of the carrier wave in a synchronous 9-pulse mode, a synchronous 6-pulse mode, and a synchronous 3-pulse mode. In the synchronous 9-pulse mode, nine carrier waves are generated in one period of the voltage command Vu*. In the synchronous 6-pulse mode, six carrier waves are generated in one period of the voltage command Vu*. In the synchronous 3-pulse mode, three carrier waves are generated in one period of the voltage command Vu*. As such, under the synchronous PWM control, the frequency of the carrier wave is controlled to be an integer multiple of the frequency of the voltage command.

Figure 9:
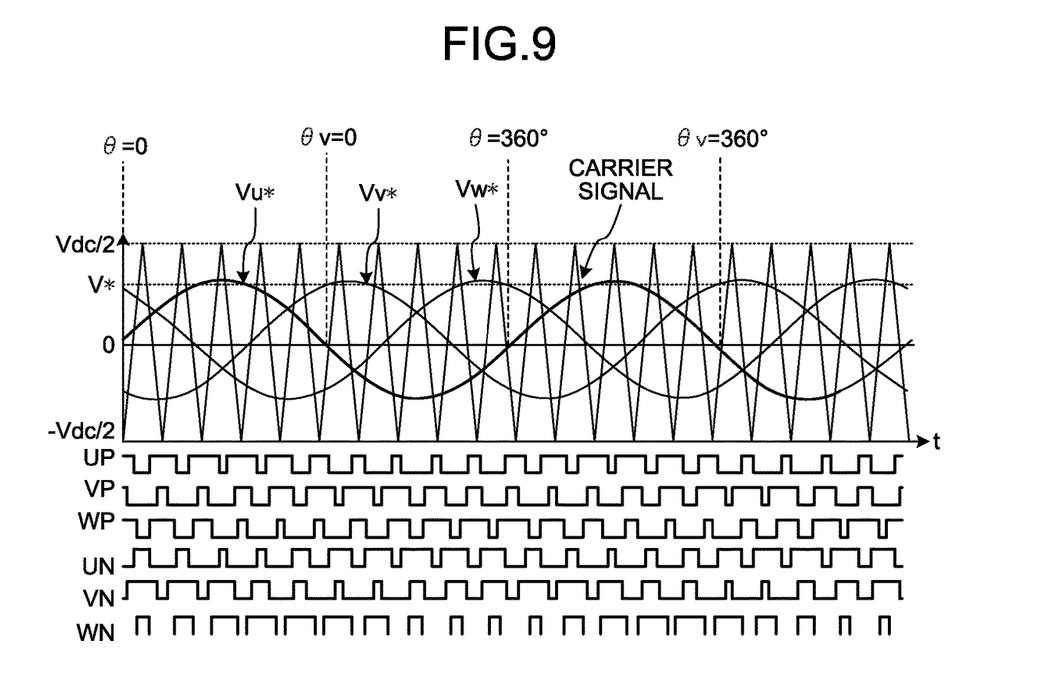
FIG. 9 is a diagram illustrating a relation among a voltage command, a carrier wave, and PWM signals.

FIG. 9 is a diagram illustrating a relation among a voltage command, a carrier wave, and PWM signals. Reference sign θ represents a position of a rotor magnetic pole, and reference sign θv represents a voltage phase. As described above, the carrier generating unit 19 generates the carrier wave of the frequency corresponding to the number of pulses N, in such a manner as to bring the carrier wave into synchronization with the voltage phase θv. The number of pulses N is a value set by the pulse-number setting unit 11 illustrated in FIG. 3. When the number of pulses N is 9, thus, the frequency of the carrier wave is 9 times the frequency of the voltage command Vu* in the carrier generating unit 19. In the PWM signal generating unit 20 in FIG. 4, the voltage command Vu* for which the voltage phase θv serves as a basis, the voltage command Vv*, and the voltage command Vw* are compared with the carrier wave, so that the PWM signals UP, VP, WP, UN, VN, and WN as illustrated in FIG. 9 are generated.

In the illustrated example, the PWM signal UP is turned on and off nine times within one period of the voltage command Vu*, that is, over the range of the voltage phase θv between 0° and 360°.

Figure 10A:
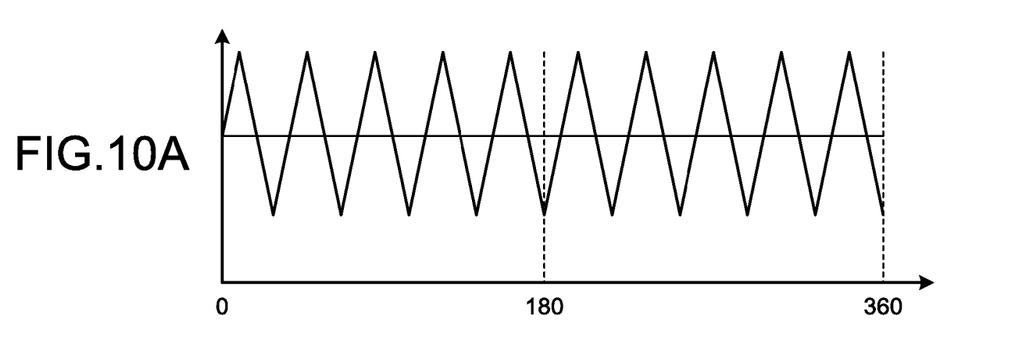
FIG. 10A is an explanatory diagram of the operation in a case where the frequency of the carrier wave is unchanged.
Figure 10B:
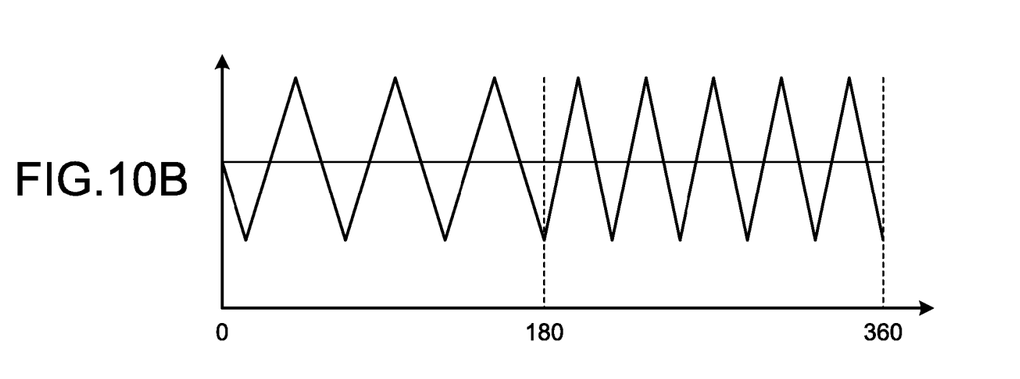
FIG. 10B is an explanatory diagram of the operation in a case where the frequency of the carrier wave is changed by the motor driving device according to the embodiment of the present invention.

FIGS. 10A and 10B are explanatory diagrams of the operation in cases where the frequency of the carrier wave is unchanged and where the frequency of the carrier wave is changed by the motor driving device according to the embodiment of the present invention. The horizontal axes in FIGS. 10A and 10B represent electric angles. In FIGS. 10A and 10B, the carrier wave generated by the carrier generating unit 19 during one revolution of the rolling piston 32 is illustrated assuming that the number of the magnetic poles of the motor 4 is three.

A carrier wave having a fixed period is illustrated in FIG. 10A. This carrier wave is a carrier wave generated when the number of pulses A of the PWM signal in the small-torque region illustrated in FIG. 6 is the same value as that of the number of pulses B of the PWM signal in the large-torque region, for example.

Meanwhile, a carrier wave having its period changed is illustrated in FIG. 10B. This carrier wave is a carrier wave generated when the number of pulses A of the PWM signal in the small-torque region illustrated in FIG. 6 is reduced to be lower than the number of pulses B of the PWM signal in the large-torque region. For the inverter control unit 8 according to the present embodiment, the carrier wave is generated as illustrated in FIG. 10B, and thus the number of pulses of the PWM signal generated in the one period of the mechanical angle of the load is reduced.

Figure 11:
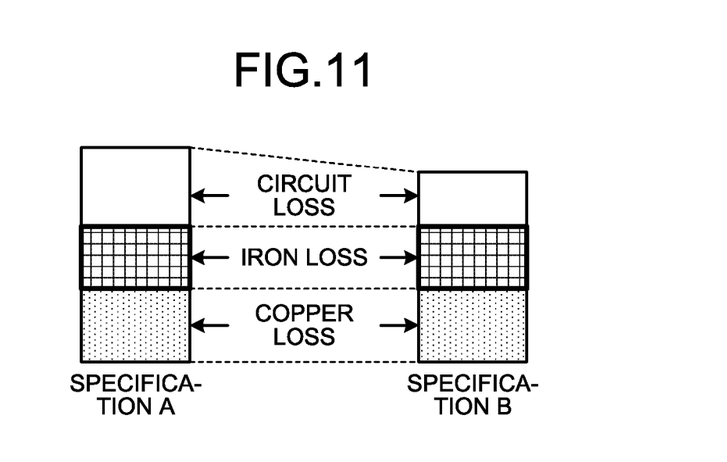
FIG. 11 is a diagram illustrating copper loss generated in the motor, iron loss generated in the motor, and circuit loss that is a total of switching loss of a plurality of semiconductor switching elements of an inverter.

FIG. 11 is a diagram illustrating copper loss generated in the motor, iron loss generated in the motor, and circuit loss that is a total of switching loss of a plurality of semiconductor switching elements of the inverter. Specification A illustrated in FIG. 11 represents a conventional motor driving device that performs normal synchronous PWM control without changing the number of pulses in one period of an electric angle irrespective of the presence or absence of a change in a load torque.

Specification B represents the motor driving device 100 according to the present embodiment. For example, normal synchronous PWM control is performed using the carrier wave illustrated in FIG. 10A in specification A, and synchronous PWM control is performed using the carrier wave illustrated in FIG. 10B in specification B. In specification B, PWM control is "thin" in the small-torque region, which increases harmonic iron loss of the motor 4, but such an increase of the harmonic loss of the motor 4 is slight because a current value is small in the small-torque region.

Meanwhile, switching loss is reduced in the small-torque region in specification B. As a result, the total loss in specification B is less than the total loss in specification A and thus an advantageous effect is obtained in some cases. Such a trend is significant, in particular, where a motor with a large copper loss ratio or a device with large switching loss such as a super-junction MOS-FET is used.

Figure 12:
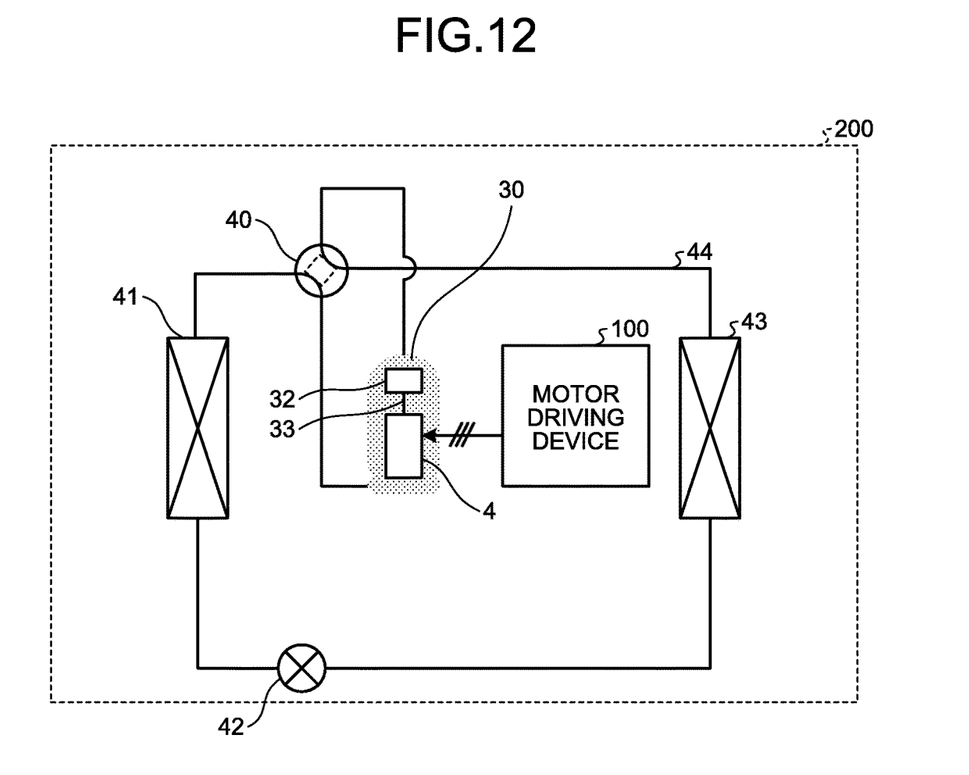
FIG. 12 is a diagram illustrating a configuration example of a heat pump device according to the embodiment of the present invention.

FIG. 12 is a diagram illustrating a configuration example of a heat pump device according to the embodiment of the present invention. A heat pump device 200 is applied to an air-conditioner or a refrigerating air-conditioning device, and includes the motor driving device 100, the compressor 30, a four-way valve 40, a heat exchanger 41, an expansion mechanism 42, and a heat exchanger 43. The compressor 30, the four-way valve 40, the heat exchanger 41, the expansion mechanism 42, and the heat exchanger 43 are connected via a refrigerant pipe 44 to one another. The compressor 30 includes the rolling piston 32 and the motor 4.

Figure 13:
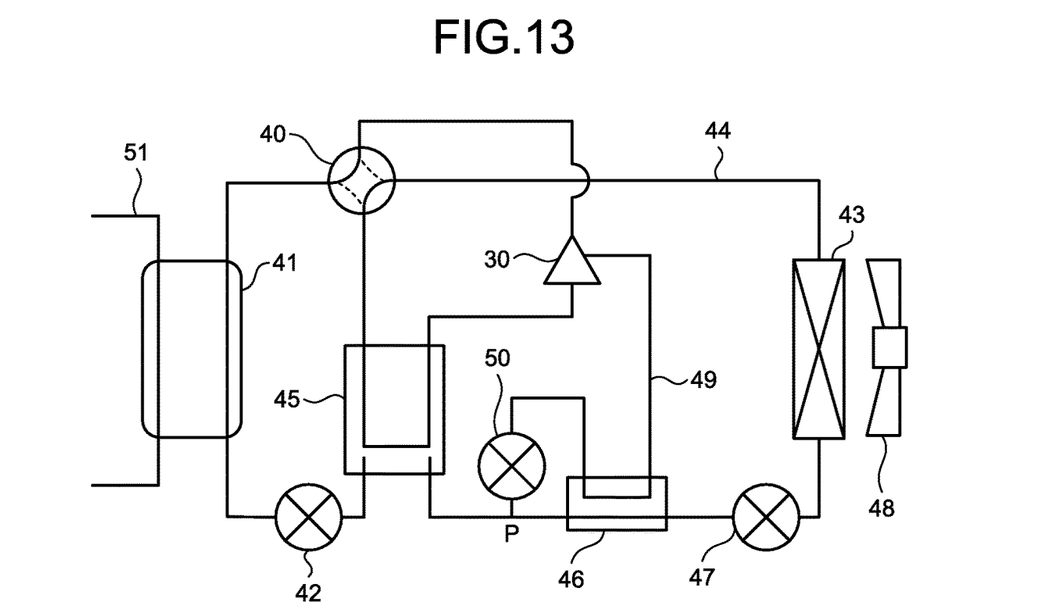
FIG. 13 is a configuration diagram of a refrigerating air-conditioning device to which a heat pump device is applied.
Figure 14:
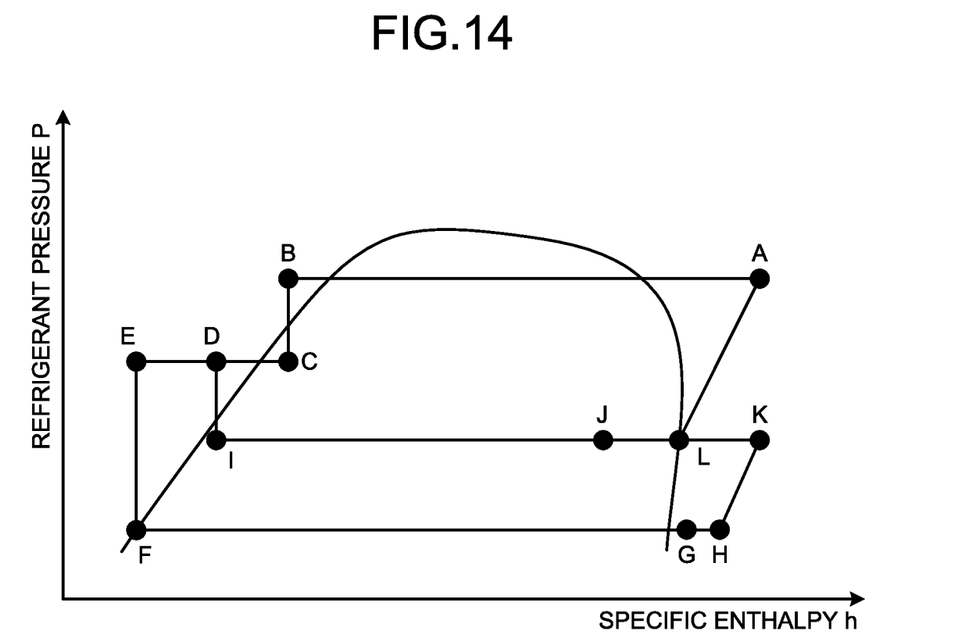
FIG. 14 is a Mollier chart of a state of a refrigerant in the refrigerating air-conditioning device illustrated in FIG. 13.

FIG. 13 is a configuration diagram of a refrigerating air-conditioning device to which a heat pump device is applied. FIG. 14 is a Mollier chart of a state of a refrigerant in the refrigerating air-conditioning device illustrated in FIG. 13. The compressor 30, the heat exchanger 41, the expansion mechanism 42, a receiver 45, an internal heat exchanger 46, an expansion mechanism 47, and the heat exchanger 43, which are illustrated in FIG. 13, are connected by pipes to one another to define a main refrigerant circuit in which a refrigerant flows through the pipe. The four-way valve 40 is disposed on the discharge side of the compressor 30 for switching the direction of flow of the refrigerant. A fan 48 is disposed near the heat exchanger 43.

The main refrigerant circuit 49 of the refrigerating air-conditioning device connects a point between the receiver 45 and the internal heat exchanger 46 to an injection pipe of the compressor 30. An expansion mechanism 50 and the internal heat exchanger 46 are connected to the main refrigerant circuit 49.

A water circuit 51, in which water is circulated, is connected to the heat exchanger 41. A device that uses water, such as a hot water dispenser, a radiator, or a radiator provided in a floor heating, is connected to the water circuit 51.

Next, an operation of the refrigerating and air-conditioning device is described with reference to FIGS. 13 and 14. First, an operation of the refrigerating air-conditioning device for a heating operation of the refrigerating air-conditioning device is explained. A refrigerant is compressed by the compressor 30, so that the refrigerant enters a high-temperature and high-pressure state illustrated at a point A in FIG. 14.

The refrigerant in the high-temperature and high-pressure state is discharged from the compressor 30 to the main refrigerant circuit 49, and is transferred to the four-way valve 40 via the main refrigerant circuit 49. After passing through the four-way valve 40, the refrigerant is transferred to the heat exchanger 41. In the heat exchanger 41, the refrigerant is cooled by heat exchange into liquid as illustrated at a point B in FIG. 14. At this time, water in the water circuit 51 is heated by heat radiated from the refrigerant and the water heated is used for heating, hot-water supply, or the like.

The refrigerant liquefied by the heat exchanger 41 is transferred to the expansion mechanism 42, such that the liquefied refrigerant is decompressed by the expansion mechanism 42 into a gas-liquid two-phase state as illustrated at a point C in FIG. 14. The refrigerant in the gas-liquid two-phase state is transferred to the receiver 45, such that the refrigerant effects heat exchange with the refrigerant transferred to the compressor 30 in the receiver 45. In this manner, the refrigerant in the gas-liquid two-phase state is cooled into liquid as illustrated at a point D in FIG. 14.

The refrigerant liquefied by the receiver 45 branches at a point P in FIG. 13 into two refrigerants. One of the two refrigerants flows to the internal heat exchanger 46 where the one refrigerant, which effects heat exchange with the other refrigerant to be transferred from the expansion mechanism 50 to the compressor 30 is further cooled as illustrated at a point E in FIG. 14. The refrigerant decompressed in the expansion mechanism 50 is in the gas-liquid two-phase state. The refrigerant cooled by the internal heat exchanger 46 is transferred to the expansion mechanism 47, such that the refrigerant is decompressed into the gas-liquid two-phase state as illustrated at a point F in FIG. 14.

The refrigerant having changed into the gas-liquid two-phase state by the expansion mechanism 47 is transferred to the heat exchanger 43 where the refrigerant effects heat exchange with outdoor air and thus is heated, as illustrated at a point G in FIG. 14. The refrigerant heated by the heat exchanger 43 is transferred to the four-way valve 40. The refrigerant having passed through the four-way valve 40 is transferred to the receiver 45. The refrigerant transferred to the receiver 45 is further heated in the receiver 45 as illustrated at a point H in FIG. 14. The heated refrigerant is transferred to the compressor 30.

Meanwhile, the refrigerant illustrated at the point D in FIG. 14, that is, the other refrigerant having branched off at the point P is decompressed in the expansion mechanism 50 as illustrated at a point I in FIG. 14. The decompressed refrigerant is subjected to heat exchange in the internal heat exchanger 46 and thus comes into the gas-liquid two-phase state as illustrated at a point J in FIG. 14. The refrigerant subjected to heat exchange in the internal heat exchanger 46 is transferred to the compressor 30.

In the compressor 30, the refrigerant transferred from the receiver 45 to the compressor 30 is compressed to an intermediate pressure as illustrated at the point H in FIG. 14. The compressed refrigerant is heated as illustrated at a point K in FIG. 14. The heated refrigerant joins the refrigerant that has been subjected to heat exchange in the internal heat exchanger 46, so that the temperature is lowered as illustrated at a point L in FIG. 14. The refrigerant having the low temperature is further compressed by the compressor 30. The heated refrigerant has a high temperature and a high pressure as illustrated at the point A in FIG. 14, and is discharged from the compressor 30 to the main refrigerant circuit 49.

Although the present embodiment has been described giving an example in which a direct current flowing between the direct-current power supply and the inverter is detected and is taken into the inverter control unit 8, a phase current detecting unit may be provided for detecting phase currents flowing between the inverter and the motor such that the phase currents detected by the phase current detecting unit are used for control by the inverter control unit 8. In this case, the phase currents detected by the phase current detecting unit are converted by the three-phase-to-two-phase converting unit 14 illustrated in FIG. 2 into the d-axis current Id and the q-axis current Iq on the d-q coordinate axes on the basis of the rotor magnetic pole position θ. In this manner, the three-phase-to-two-phase converting unit 14 provides the d-axis current and the q-axis current by using the direct current or the phase currents.

Although, in the present embodiment, the pulse-number setting unit 11 illustrated in FIG. 3 estimates a value of a load torque corresponding to one period of the mechanical angle of a load from the q-axis current Iq, any current information on the correlation between the load torque and the mechanical angle can be used. For example, to set the number of pulses, the pulse-number setting unit 11 may use motor phase currents Iu, Iv, and Iw in place of the q-axis current Iq that is a direct current amount after the coordinate conversion, or may use the d-axis current Id provided by the three-phase-to-two-phase converting unit 14 in place of the q-axis current Iq.

Although the present embodiment has been described giving an example of control where the one period of the mechanical angle of the load is divided into the two periods corresponding to the small-torque region and the large-torque region, as illustrated in FIG. 6, the one period of the mechanical angle may be divided into other than two. For example, the one period of the mechanical angle of the load may be divided into three or more periods, and the pulse-number setting unit 11 may set the number of pulses of a carrier wave in each of the plural periods, the number of pulses of the carrier wave having different values in the different periods. By dividing the one period of the mechanical angle into three or more periods and setting the number of pulses corresponding to each period, the carrier frequency can be changed more finely.

In addition, in the present embodiment, the inverter control unit 8 includes at least a processor and a memory, and the operation of the inverter control unit 8 can be achieved by software.

As described above, the motor driving device according to the present embodiment includes the inverter and the inverter control unit. The inverter control unit receives inputs of the direct-current voltage, detected between the direct-current power supply and the inverter, and the current, detected between the direct-current power supply and the motor, and generates and outputs the pulse-width modulation signal to the inverter, such that the inverter performs the switching operation. The inverter control unit reduces the number of pulses of the pulse-width modulation signal generated during the first period within the one period of the mechanical angle of the load, the reduced number of pulses being smaller than the number of pulses of the pulse-width modulation signal generated during the second period within the one period of the mechanical angle of the load.

With this configuration, the number of pulses of the PWM signal in the small-torque region is reduced to be smaller than the number of pulses of the PWM signal in the large-torque region, so that the number of times of the switching operation in the small-torque region can be reduced. Therefore, the circuit loss in the small-torque region can be reduced, thereby achieving further reduction in the loss of the inverter 5.

The configurations described in the above embodiment are only examples of the content of the present invention. The configurations can be combined with other well-known techniques, and a part of each configuration can be omitted or modified without departing from the scope of the present invention.

The invention claimed is:

1. A motor driving device that drives a motor with an alternating-current power converted from a direct-current power, the motor driving device comprising:

an inverter that includes a plurality of semiconductor switching elements, wherein each semiconductor switching element receives a synchronous pulse-width modulation signal, and the inverter supplies the alternating-current power to the motor; and an inverter control unit that generates the synchronous pulse-width modulation signal and supplies the pulse-width modulation signal to the inverter, wherein the inverter control unit is configured to:

estimate a load torque corresponding to one period of a mechanical angle of the motor;

set a carrier wave pulse-number corresponding to the estimated load torque; and based on the set carrier wave pulse-number, reduce a number of pulses of the synchronous pulse-width modulation signal generated during a first period within the one period of the mechanical angle to be lower than the number of pulses of the synchronous pulse-width modulation signal generated during a second period within the one period of the mechanical angle, to reduce a circuit loss, which is a total of switching losses of the plurality of semiconductor switching elements, wherein the one period of the mechanical angle corresponds to one revolution of a rotor of the motor, the first period and the second period are defined by a mechanical angle between 200° and 240° when a mechanical angle of 0° corresponds to a top dead center of a rolling piston, and the first period is a period during which the load torque is lower than the load torque during the second period.

2. The motor driving device according to claim 1, further comprising a current detecting unit that detects a direct current flowing between a direct-current power supply and the inverter or a phase current flowing between the inverter and the motor.

3. The motor driving device according to claim 2, wherein the inverter control unit includes a coordinate converting unit that obtains a d-axis current and a q-axis current by using the direct current or the phase current.

4. The motor driving device according to claim 2, wherein the inverter control unit includes a pulse-number setting unit that sets number of pulses of a carrier wave for generating the synchronous pulse-width modulation signal, by using the direct current or the phase current.

5. The motor driving device according to claim 3, wherein the inverter control unit includes a pulse-number setting unit that sets number of pulses of a carrier wave for generating the synchronous pulse-width modulation signal, by using the d-axis current or the q-axis current.

6. The motor driving device according to claim 4, wherein the one period of the mechanical angle of the motor is divided into a plurality of periods, and the pulse-number setting unit sets the number of pulses of the carrier wave in each of the periods, the number of pulses of the carrier wave having different values in the different periods.

7. The motor driving device according to claim 1, wherein the inverter control unit includes a pulse-number changing unit that changes the number of pulses of the synchronous pulse-width modulation signal once or more within the one period of the mechanical angle of the motor.

8. The motor driving device according to claim 1, wherein the inverter control unit includes a pulse-number changing unit that changes the number of pulses of the synchronous pulse-width modulation signal within one period of an electric angle of a voltage command.

9. The motor driving device according to claim 1, wherein the inverter control unit includes a pulse-number changing unit that changes the number of pulses of the synchronous pulse-width modulation signal when a frequency of a voltage command is a certain value or less.

10. The motor driving device according to claim 1, wherein the inverter control unit includes a pulse-number changing unit that changes the number of pulses of the synchronous pulse-width modulation signal when an average value of a load torque in the one period of the mechanical angle of the motor is a certain value or less.

11. A refrigerating air-conditioning device having the motor driving device according to claim 1 mounted thereon.

12. The motor driving device according to claim 1 further comprising:
 a voltage detecting unit that detects a voltage value of a direct-current voltage applied to an input side of the inverter; and
 a current detecting unit that detects a current value of a direct current flowing to the inverter,
 wherein
 the inverter control unit includes a voltage-command generating unit that generates a voltage command on the basis of the voltage value detected by the voltage detecting unit and a current value detected by the current detecting unit, and
the voltage-command generating unit includes:
 a current restoring unit that restores motor phase currents flowing to the motor from the current value detected by the current detecting unit;
 a three-phase-to-two-phase converting unit that converts the motor phase currents restored by the current restoring unit into a d-axis current and a q-axis current on d-q coordinate axes on the basis of a rotor magnetic pole position of the motor;
 a position-and-speed estimating unit that estimates the rotor magnetic pole position and a speed estimated value on the basis of the d-axis current and the q-axis current provided by the three-phase-to-two-phase converting unit and voltage commands; and
 a current-command generating unit that generates a q-axis current command that is a command value of a q-axis current on the d-q coordinates, at which the speed estimated value matches a speed command value.

* * * * *